Aug. 29, 1961    M. BODNER ET AL    2,998,585
TRANSDUCER
Filed May 21, 1957
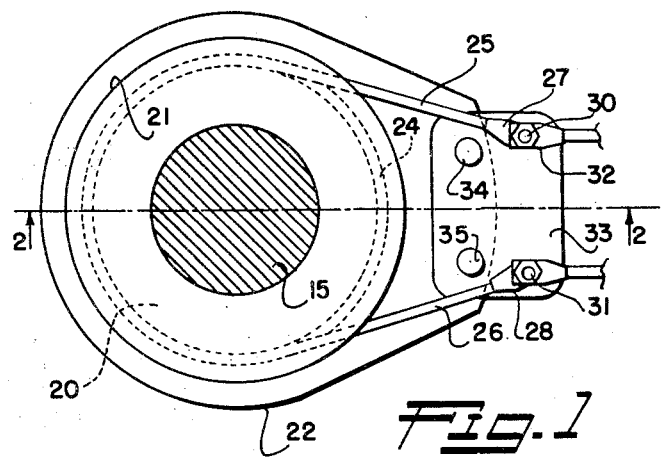
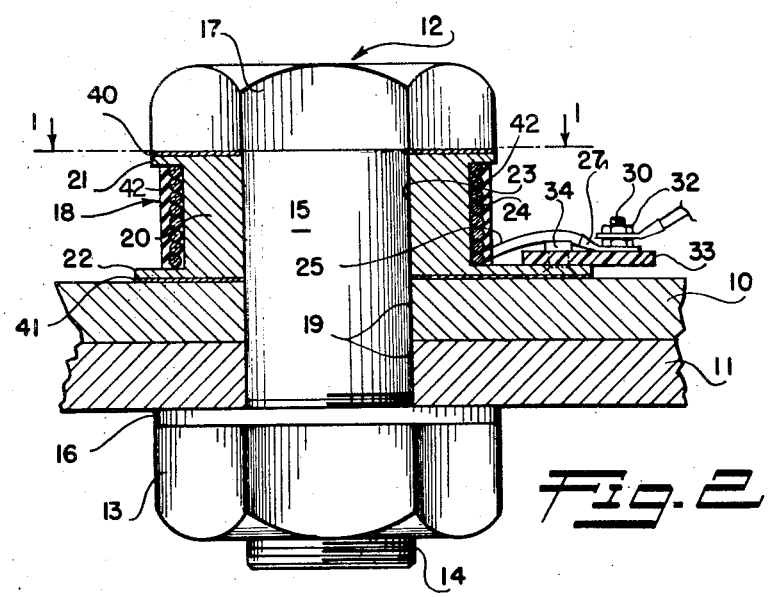
INVENTORS
MARTIN BODNER
WARD B. BREWER
By George C. Sullivan
Agent _United States Patent Office_

2,998,585
Patented Aug. 29, 1961

2,998,585
TRANSDUCER
Martin Bodner, Glendale, and Ward B. Brewer, Burbank, Calif., assignors to Lockheed Aircraft Corporation, Burbank, Calif.
Filed May 21, 1957, Ser. No. 660,711
2 Claims. (Cl. 338—5)

This invention relates to transducers and more particularly to a transducer for measuring stress and strain of a structural member having pressure loads applied thereto.

It is frequently necessary to measure tension in bolts, screws or similar parts in order to adequately measure the structural capabilities of these parts when they are employed to secure two or more parts together which are subjected to varying load conditions. For example, bolts are normally used in the construction of airplanes to connect the wings to the fuselage. This type of connection requires very critical dimensions and the tolerances of these parts are closely held. In measuring tension in the bolts connecting the wings to the airplane fuselage, it has been the conventional practice to employ a variety of strain sensing elements which are fastened to specially fabricated bolts so that stresses and strains placed on the bolt will be reflected by an electrical output proportional to the amount of tension. Also, special types of bolts having reduced diameters, flat portions provided on the shank or internal bores are currently available having strain sensing elements secured to the outside of the bolt shank or in some cases, secured to the bore provided in the shank of the bolt.

Difficulties have been encountered when employing the conventional practices described above which are partially due to the fact that special fabrication of the bolt is required to accommodate the strain sensing element prior to the bolt being subject to the structural test. Therefore, whenever the bolt per se is an integral part of the structural test, it is obvious that only superficial measurements can be made since the actual structure of the bolt has been altered. An altered bolt will not react to a given load in the same manner as if the bolt were unaltered. Furthermore, where unbalanced loads are encountered by the bolt, there is a tendency to force the strain sensing element into engagement with other structural parts. This engagement may cause the shorting of an electrical circuit in which the strain sensing element is a part and thereby obviate the sensing element as a component of the structural test.

In accordance with the present invention, the above difficulties are overcome by providing a transducer which may be employed as a washer which comprises, in general, a main body portion separating a pair of annular flanges, wherein the body portion serves as a core around which many turns of strain gage wire are wound. A solid lubricant washer is interposed between the engagement of the head of the bolt and one flange of the transducer and also is interposed between the structure and the other flange of the transducer. Both ends of the strain gage wire terminate at terminals mounted on an insulated board secured to one flange of the transducer so that conventional electrical recording equipment may be readily connected.

It is an object of the present invention to provide a novel transducer for measuring tension in bolts, screws and similar parts which does not require alteration of the configuration of a bolt, screw or part as normally used.

Another object of the present invention is to provide a novel strain sensing transducer for measuring tension in bolts, for example, which is readily adaptable to many sizes of bolts without necessitating alteration of the configuration of the bolt as normally used.

Another object of the present invention is to provide a transducer suitable for use as a washer between the head of the bolt and the surface of supporting structure. A feature resides in the employement of a solid lubricating means provided on opposing sides of the washer so that loads placed on the bolt or the structure will allow the washer to flex in accordance with the varying applied loads.

Still a further object of the present invention is to provide a novel strain sensing transducer which readily measures tension in bolts, screws and similar parts generated in structural testing without altering the configuration of the part or requiring its replacement with a standard part upon the completion of the structural tests.

Another object of the present invention is to provide a novel strain sensing means which is not susceptible to short circuiting or physical breakdown of the sensing element except under complete destructive test conditions. Consequently, the application of unbalanced loads to the transducer will not interfere with the measurement of stress and strain.

Other objects and advantages will be readily apparent from the following description with reference to the accompanying drawings wherein:

FIGURE 1 is a plan view of the present invention taken in the direction of arrows 1—1 of FIGURE 2; and FIGURE 2 is an elevational view in section taken along in the direction of arrows 2—2 of FIGURE 1.

With reference to the drawings, a pair of structural members 10 and 11 is shown which are secured together by transducer which includes a bolt 12 and a nut 13 engageable with external threads 14 carried on a shank 15 of bolt 12. Interposed between structural member 11 and nut 13, there is provided a metal washer 16.

Bolt 12 is provided with a head 17 integrally formed with shank 15. Normally, a conventional type of washer, such as washer 16, is provided between head 17 and of bolt 12 and structural member 10. However, the transducer of the present invention serves the purpose of a conventional washer with the additional feature of serving as a strain sensing means capable of measuring varying degrees of stress, strain and tension placed on bolt 12 via loads placed on structural members 10 and 11. By employing a strain sensing means 18 which serves as a washer, it is not necessary to alter the configuration of the bolt or nut in order to accommodate a strain sensing means. Also, the present invention need not be removed after measurements have been taken and thereby may be employed to serve as a conventional washer. This feature obviates the necessity of removing the bolt to replace it with a conventionally unaltered bolt.

Transducer 18 further includes a metallic main body portion 20 separating a pair of integrally formed annular flanges 21 and 22. The body portion is provided with a bore 23 of suitable diameter to accommodate shank 15 of bolt 12. Body portion 20, further, serves as a core around which many turns of a suitable strain gage wire 24 is wound. Strain gage wire 24 is a fine strain sensitive resistance wire having an approximate diameter of 0.001 inch and is preferably cemented on the circumference of body portion 20 by means of a conventional cement, such as Duco. Inasmuch as the strain gage wire 24 is wound around body portion 20 so that adjacent turns of wire engage, it is preferred that insulated strain gage wire be employed. The insulation may take the form of an enamel painted coating or may be of woven cotton. It is to be understood that the windings of strain gage wire need not engage for some applications of this transducer and in this event insulated wire is not required. However, in this instance installation should be provided about the circumference of the body portion 20 in order to electrically isolate the wire from the washer.

Leads 25 and 26, representing opposing ends of the strain gage wire wound about body portion 20, are provided with connectors 27 and 28 respectively which may be suitably connected to a pair of terminals 30 and 31 by means of nuts such as nut 32. Terminals 30 and 31 are suitably secured to a terminal board 33 composed of electrically non-conducting material. Terminal board 33 is suitably secured to flange 22 of the transducer by a pair of rivets 34 and 35.

Terminals 30 and 31 may be suitably connected to electrical recording equipment for supplying operating current to the transducer and for recording variations of current proportional to the force applied to the transducer.

In order that the transducer can expand and retract freely under load, a means of reducing friction 40 and 41 are disposed in engagement between flange 21 and head 17 of bolt 12 and disposed in engagement between flange 22 and the surface of structural member 10. Without providing such a friction reducing means, a calibration curve for the transducer will show an appreciable amount of apparent hysteresis. In the present instance, the friction reducing means may take the form of a thin washer of leadfoil, Teflon foil or similar material which acts as a high pressure solid lubricant so that when load forces are applied to the bolt, the main body portion 20 and flanges 21 and 22 may flex in response to the applied loads.

In actual operation, shank 15 of bolt 12 is inserted through bore 23 of transducer 18 and bore 19 provided in structural members 10 and 11. Washer 16 is placed over shank 15 and nut 13 is rotated about shank 15 on threads 14 to secure structural member 10 with structural member 11. Shank 15 of bolt 12 also passes through washers 40 and 41 interposed between head 17 and flange 21 and flange 22 and the surface of structural member 10, respectively. Upon a supply of current applied to terminals 30 and 31, any static or dynamic pressure force applied on the flat face of the transducer produces a barreling effect on the circumference of body portion 20 which produces at this time strain in wire 24. The strain produced in wire 24 is proportional to the force applied which effects the resistance of wire 24. Any change in resistance of wire 24 effects the current which is recorded by remotely located equipment (not shown).

It is to be understood that additional windings of strain sensitive wire may be added around body portion 20 as needed to produce two or more active strain elements or for temperature compensation.

Having described only typical forms of the invention we do not wish to be limited to the specific details herein set forth, but wish to reserve to ourselves any variations or modifications that may appear to those skilled in the art and fall within the scope of the following claims.

We claim:

1. An electrical resistance transducer for measuring stress in structural connection members which secure structural pieces together comprising, a spool-shaped body having a central bore extending throughout its length, a portion of a connection member extending through said bore and separable therefrom, said connection member having a flanged portion extending substantially coextensive to an end of said body, a pair of solid lubricant annular discs covering the opposite end faces of said body, said discs constituted from at least one of the materials from the group consisting of lead foil and polytetrafluoroethylene, one of said discs coextensive with the area of overlap of said connection member flanged portion with an end of said body, a second of said discs coextensive with the area of overlap of a structural piece with the other end of said body, said pair of discs permitting radial expansion and contraction of said body responsive to axial forces applied to the opposite end surfaces of said annular discs by said connection member flanged portion moving relative to one of said structural pieces, said spool-shaped body having an unrestricted outside surface for permitting freedom of radial expansion, a plurality of strain responsive wire turns of given electrical resistance secured about the circumference of said cylindrical body, electrical insulating material disposed between said strain responsive wire turns and said body and between adjacent wire turns, and the resistance of said wire turns varying in response to the expansion and contraction of said main body.

2. An electrical resistance transducer for measuring stress in structural connection bolt shanks in situ while said bolt is connecting structural pieces, comprising a main cylindrical body having a central bore extending throughout its length, a portion of said bolt shank extending through said bore and separable therefrom, a pair of integrally formed flanges on opposite ends of said body radially projecting beyond the outside circumferential surface plane of said body, said bolt shank having a bolt head extending substantially coextensive with the area of one of said flanges, a pair of solid lubricant annular discs covering the opposite end faces of said flanges, said discs constituted from at least one of the materials from the group consisting of lead foil and polytetrafluoroethylene, one of said discs coextensive with the area of overlap of said bolt head with an end face of one of said flanges, a second of said discs coextensive with the area of overlap of a structural piece with the end face of the other of said flanges, said pair of discs permitting radial expansion and contraction of said body responsive to axial forces applied to the opposite end surfaces of said annular discs by said bolt head moving relative to one of said structural pieces, said body and said flanges having unrestricted circumferential surfaces for permitting freedom of radial expansion, a plurality of strain responsive wire turns of given electrical resistance secured about the circumference of said electrical body, electrical insulating material disposed between said strain responsive wire turns and said body and between adjacent wire turns, and the resistance of said wire turns varying in response to the expansion and contraction of said main body.

References Cited in the file of this patent

UNITED STATES PATENTS

| Number | Name | Date |
|---|---|---|
| 1,356,404 | Robinson | Oct. 19, 1920 |
| 2,292,549 | Simons | Aug. 11, 1942 |
| 2,396,916 | Guthrie | Mar. 19, 1946 |
| 2,467,752 | Howe | Apr. 19, 1949 |
| 2,493,029 | Ramberg | Jan. 3, 1950 |
| 2,523,464 | Golden | Sept. 26, 1950 |
| 2,636,964 | Lancor et al. | Apr. 28, 1953 |
| 2,678,585 | Ellis | May 18, 1954 |
| 2,704,676 | Harding | Mar. 22, 1955 |
| 2,867,118 | Cavanagh | Jan. 6, 1959 |
| 2,920,880 | Laycock | Jan. 12, 1960 |